(12) United States Patent
Powell et al.

(10) Patent No.: US 11,502,902 B2
(45) Date of Patent: Nov. 15, 2022

(54) NETWORK EVENT CORRELATION

(71) Applicant: Hewlett Packard Enterprise Development LP, Houston, TX (US)

(72) Inventors: John A. Powell, Granite Bay, CA (US); David L. Santos, Granite Bay, CA (US); Devon L. Dawson, Rocklin, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 566 days.

(21) Appl. No.: 16/170,943

(22) Filed: Oct. 25, 2018

(65) Prior Publication Data

US 2020/0136904 A1 Apr. 30, 2020

(51) Int. Cl.
*H04L 41/0816* (2022.01)
*H04L 41/069* (2022.01)
*H04L 41/0677* (2022.01)

(52) U.S. Cl.
CPC ........ *H04L 41/0816* (2013.01); *H04L 41/069* (2013.01); *H04L 41/0677* (2013.01)

(58) Field of Classification Search
CPC ............... H04L 41/0816; H04L 41/069; H04L 41/0677; H04L 41/065; H04L 41/0663
See application file for complete search history.

(56) References Cited

U.S. PATENT DOCUMENTS

| | | | |
|---|---|---|---|
| 7,526,772 B2* | 4/2009 | Childress | G06F 9/542 709/223 |
| 7,640,317 B2* | 12/2009 | Jain | H04L 41/028 709/213 |
| 7,779,404 B2* | 8/2010 | Movassaghi | H04L 41/0813 717/168 |
| 7,885,194 B1* | 2/2011 | Narin | H04L 41/0686 370/241 |
| 8,370,462 B2* | 2/2013 | Pelletier | H04L 41/0604 709/220 |
| 9,923,787 B2* | 3/2018 | Ngoo | H04L 41/147 |
| 10,142,168 B2* | 11/2018 | Vaidyanathan | H04L 41/0677 |
| 2014/0039958 A1* | 2/2014 | Bivens | G06Q 10/06 705/7.15 |
| 2014/0122709 A1* | 5/2014 | Golani | H04L 43/08 709/224 |
| 2014/0136690 A1* | 5/2014 | Jain | H04L 41/5012 709/224 |
| 2014/0172919 A1* | 6/2014 | Johnston | H04L 41/0636 707/797 |
| 2018/0219742 A1* | 8/2018 | Fainberg | H04L 41/069 |

(Continued)

*Primary Examiner* — Patrice L Winder
(74) *Attorney, Agent, or Firm* — Hewlett Packard Enterprise Patent Department

(57) ABSTRACT

Examples disclosed herein relate to a method comprising collecting, by a network monitoring tool, network data from a first device on a network. The method comprises identifying, by the network monitoring tool, a potential issue from the network data, wherein the potential issue corresponds to one aspect of the network and transmitting, by the network monitoring tool, the potential issue to a network management tool. The method also comprises identifying, by the network management tool, a first network configuration that the potential issue relates to and creating, by the network management tool, a second network configuration for the network to fix the potential issue.

18 Claims, 4 Drawing Sheets

(56) References Cited

U.S. PATENT DOCUMENTS

| | | | |
|---|---|---|---|
| 2018/0270109 A1* | 9/2018 | Hollis | H04L 41/0803 |
| 2018/0287855 A1* | 10/2018 | Paramaguru | H04L 41/069 |
| 2019/0081850 A1* | 3/2019 | Nazar | H04L 41/0631 |
| 2021/0067428 A1* | 3/2021 | Floyd | H04L 41/069 |
| 2021/0203673 A1* | 7/2021 | dos Santos | H04L 41/0609 |

\* cited by examiner

NETWORK EVENT CORRELATION

BACKGROUND

A network device, such as a switch, may be configured to operate network traffic in a desired way. It may be beneficial to detect anomalies and/or errors in the configuration.

BRIEF DESCRIPTION OF THE DRAWINGS

The following detailed description references the drawings, wherein.

DETAILED DESCRIPTION

A networking monitoring tool may track network traffic/events and a network configuration management tool may be used to configure devices on a network. It may be beneficial to correlate these two types of data to detect anomalies and/or errors in the configuration. A configuration may be a set of settings and/or attributes that control how an item in a system operates. Currently, it is a manual process to correlate the data from these two networking tools which is time consuming.

Systems and method described herein may use the data generated by a networking monitoring tool which tracks network traffic/events along with data generated by a network configuration management tool. The two data sets may be correlated to identify if a network device configuration change was the cause of a network event. The network analytics error provides information on the failure while the management tool provides the content of the configuration change. The information between the two systems are systematically parsed for error content against configuration change content to create an association. Two examples of the correlations that could be performed are: 1) chronologically, 2) event type to configuration change area.

In at least one embodiment, the subject matter claimed below includes a method. The method may comprise collecting, by a network monitoring tool, network data from a first device on a network and identifying, by the network monitoring tool, a potential issue from the network data, wherein the potential issue corresponds to one aspect of the network. The method may also comprise transmitting, by the network monitoring tool, the potential issue to a network management tool and identifying, by the network management tool, a first network configuration that the potential issue relates to. The method may also comprise creating, by the network management tool, a second network configuration for the network to fix the potential issue.

Figure 1A:
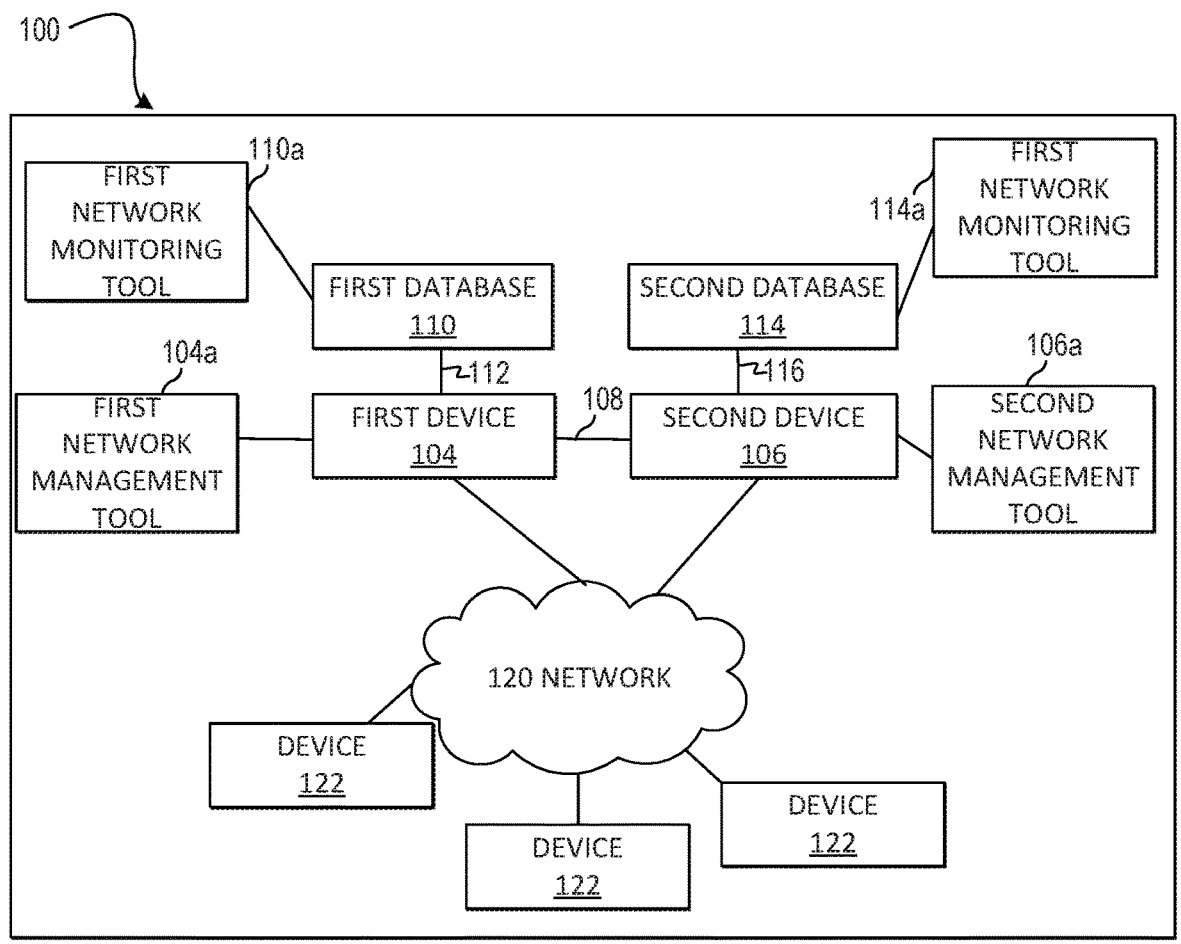
FIG. 1A is a block diagram of an example system where network event correlation may be useful.

FIG. 1A is a block diagram of an example system 100 where network event correlation may be useful. The system 100 may include a first device 104 and a second device 106 connected by a link. First management tool 104a may be connected to first device 104 and second management tool 106a may be connected to second network management tool 106a. First device 104 may be connected to a first database 110 and second device 106 may be connected to a second database. First database 110 may be connected to first network monitoring tool 110a and second database 114 may be connected to first networking monitoring tool 114a. The links may be a physical link, such as an Ethernet connection or other physical connection, a wireless connection, a virtual connection, etc.

A network switch, such as switch 104 and peer switch 106, may have routing capabilities such that the switch is responsible for routing data along a route (or equivalently, path) in a network 120. The switch may perform routing of data based on routing information accessible by the router. For example, the routing information can be stored on a storage medium of the router, or on a storage medium separate from but accessible by the router.

In some aspects, one or both of the databases 110 and 114, one or both of the network management tools 104a and 106a and one or both of the network monitoring tools 110a and 114a may be incorporated into the correspond device 104 and/or 106. In some aspects the first network monitoring tool 110a may be directly connected to first device 104. Additionally, first network management tool 104a may be directly connected to first database 110. Similarly, the second network monitoring tool 114a may be directly connected to second device 106. Additionally, second network management tool 106a may be directly connected to second database 114.

Some aspects of system 100 may include more or less than the two network devices depicted in FIG. 1A. Each device may have a corresponding database, network monitoring tool and/or network management tool. In some aspects, one network monitoring tool may be used to monitor multiple devices in the system 100. Similarly, in some aspects, one network management tool may be used to manage multiple devices in system 100. In some aspects, one database may be used to store data corresponding to multiple devices.

System 100 generally and network 120 in particular represent, in this example, an enterprise network that may be maintained by one or more system administrators. In this example, the one or more system administrators may use first network management tool 104a and second network management tool 106a to interact with first database 110 and second database 114 to monitor status of network devices in system 100. Network monitoring tools 110a and 114a may enable collection of data in system 100 and network 122. As shown, system 100 includes network 120 which includes devices 122. Of course, this is for explanatory purposes only and other numbers of devices may be included.

Note that, in practice, there may be hundreds or even thousands of network devices within an actual network configuration domain of a large corporation or enterprise, but for simplicity only three are shown here. In modern enterprise networks, most network devices are dedicated switches, routers, or bridges, however, server computers may be configured to perform functions of a network device and may be used in that manner by smaller entities. The concepts of this disclosure are not limited to dedicated network devices and may work advantageously with any existing device configured to support networking functions.

Network monitoring tools 110a and 114a may enable collection of data in system 100 and network 122. When a network monitoring tool 110a and/or 114a detects an anomaly, it can proactively collect additional statistics and data to proactively troubleshoot the problem. The network monitoring tool 110a and/or 114a may use scripts that get triggered when a specific event occurs on the network 120 and collects additional interesting and relevant network information. In some aspects, the network monitoring tool 110a and/or 114a may be programmed by a user, such as a system administrator to collect certain data.

Network monitoring tool 110a and/or 114a may also be triggered by user defined rules. An example of a rule is short-term-high-CPU, where additional context is collected when the CPU utilization exceeds a certain threshold for a specified period of time.

Network monitoring tool 110a and/or 114a may also gather event logs from multiple applications and infrastructure. Additional information may be collected to provide further context around specific events occurring in the network 120, such as event logs corresponding to large number of devices, applications, etc. in the network 120.

Network monitoring tool 110a and/or 114a may monitor traffic of applications executing on devices 122 as it traverses through network 120. A system administrator may, for example, setup lists to monitor applications, such as cloud applications, and track the performance of the monitored application across time in the network. When an issue is detected, network diagnostics can be automatically performed. For example, if one of the BGP peered ISP's is providing degraded service, the network monitoring tool 110a and/or 114a may be used provide insight immediately via collected data.

The network monitoring tool 110a and/or 114a may utilize one or more databases, such as first database 110 and second database 114. The connected database may include a configuration database, time series database, etc. The configuration database may provide direct access to the entire current state and statistics for the network, all statistics included. The time series database may provide historical information for network devices, statistics, etc.

The database, such as first database 110 and second database 114, may store some or all of the configuration, status, states and statistics of the network 120, the first device 104, the second device 106 and/or other devices on the network 120 at any given point at time. The different state data may be accessed from the databases 110 and 114 either individually (data for a given time, a given device, etc.) or in aggregate (data aggregated for particular items over a given time period, etc.). In other words, the state of the switch may be retrieved from any arbitrary state to any other arbitrary state by manipulating the database. The first device 104 and/or second device 106 may respond to these manipulations by reconfiguring itself to and perform any functionality required to achieve that state.

In this manner, the devices 104 and/or 106 have access to numerous data points of information for devices 122 on the network 120 and the network 120 itself at different points in time. This also provides the devices 104 and/or 106 with a wide variety of information for monitoring, analysis, troubleshooting, etc.

In one aspect, first network management tool 104a and second network management tool 106a may be configured to use first database 110 and second database 114 to maintain data to support a network configuration change validation environment for the network management tool. First database 110 and second database 114 may be configured to maintain data representative of network configuration validation and test results as well as test actions (e.g., monitoring commands) corresponding to individual network devices within system 100. In one example implementation attributes may be stored within a relational database such that data may be extracted in a manner to support a proper association with corresponding individual network devices.

Functions performed using first database 110 and second database 114 include, but are not limited to, test action storage; difference identification; historical results storage (e.g., timeseries data); test initiation criteria; roll back criteria; and device and command mapping information (e.g., the above-mentioned association between test action commands and individual network devices). First network management tool 104a and second network management tool 106a may have backend functions configured to execute on processors of first device 104 and second device 106, or they may execute, as appropriate, as distributed components throughout the system 100. Actual execution locations are implementation dependent and may vary based on many factors.

The systems that state information may be collected from may also include non-wired network systems such as wireless network controllers, dynamic host configuration protocol ("DHCP"), and domain name services ("DNS"), business application servers, critical clients, or IoT devices, etc. The choice of devices and systems for state information collection may be enterprise business specific and may be customized and controlled by information in first database 110 and second database 114 as needed. The display of the before and after state information may be presented using an intelligent difference format, with the significant differences highlighted. For example, if the network configuration change inadvertently modified the routing within the network, the number of routes may be reduced in number. This possible undesired change may then be highlighted in the display to draw the attention of a network administrator.

In some cases, the information collected before and after may be expected to be different given the natural variations in network operation. For example, the number of packets entering and leaving a network switch would vary based on network client activity. The envelop, or baseline profile, of normal operation may be learned from a time-series database of network configuration data, such as data stored in first database 110 and second database 114. For example, test actions may be run periodically (or at varying times) to collect metrics to indicate the network state information that is collected and maintained for future comparison. First database 110 and second database 114 may also contain test initiation criteria include records for each device and system, including its name, network address, type of device or system, and credentials necessary to execute commands.

Network management tool may include an editor or viewer style graphical interface capable of providing validation, parameter setting completion assistance, and expert help, among other things, for a system administrator interactively editing a network device configuration. The insights editor may provide just-in-time assistance to a system administrator when editing network configuration parameters for network devices within a network configuration domain. The assistance may be obtained from multiple internal and external sources. For example, some implementations of an insights editor may obtain data from one or more of: information about the device being updated (e.g., current neighbors, route table, number of access control lists (# ACLs) in use, names of ACLs configured but not applied, etc.); corporate standards; industry standards; design documentation; information from and about neighboring devices (e.g., interface configuration of neighbor, VLAN membership, IP subnets, MTU, etc.); the set of all known network devices within the network configuration domain (e.g., all RADIUS servers configured on any 802.1x switch, all IP's used on VLAN 10, all VRF's names); systems that use or provide services on the network (e.g., a VoIP server and the list of TCP ports it is using for voice and video communication); time series data (for example by applying machine learning and other expert techniques to time series data to detect appropriate ranges for parameters of configuration; just-in-time validation commands; and a simulation of the network (e.g., which switch will have the winning STP priority to become Root bridge. What would the winning value need to be to take over Root bridge. Similar for OSPF elections etc.).

Of course, information from each available source may be weighted with respect to each other, for expected reliability, or based on other possible criteria, such that information from some sources may be given higher priority than data from other sources. In cases where information is in conflict, data from higher priority sources may be used and the conflicting data may be ignored. Alternatively, the conflicting information may initiate an alert or pop up dialog, to inform the network administrator of different potential concerns.

Control of which validation actions are performed on which devices may be maintained within first database 110 and second database 114. For example, a system administrator using first network management tool 104a and second network management tool 106a may request (or automatically cause) collection of metrics associated with a set of network devices. The output of this collection may be stored in first database 110 and second database 114 as a record of the network operational state or configuration of certain devices before a planned configuration change. Simple network management protocol ("SNMP") may also be used to collect information from certain devices.

The validation action results and insight information may be collected from many different data sources, including wired or non-wired network systems such as wireless network controllers, dynamic host configuration protocol ("DHCP"), and domain name services ("DNS"), business application servers, critical clients, or IoT devices, etc. The choice of devices and systems for information collection may be enterprise business specific and may be customized and controlled by information in first database 110 and second database 114 as needed.

In some cases, the information collected at an instant in time may be different than expected given the natural variations in network operation. For example, the number of packets entering and leaving a network switch would vary based on network client activity. The first network management tool 104a and second network management tool 106a may consider temporary variations and provide insights information regarding this potentially temporary condition only if it deviated from the normal envelop of operation (e.g., as defined by a threshold). The envelope, or baseline profile, of normal operation may be learned from a time-series database of first database 110 and second database 114. For example, test actions may be run periodically (or at varying times) to collect metrics to indicate the network and device information so that it is collected and maintained for future comparison (or machine learning). First database 110 and second database 114 may also contain validation action initiation criteria that may include records for each device and system, including its name, network address, type of device or system, and credentials necessary to execute commands.

However, there may be a benefit in correlating data generated by the networking monitoring tool and the data generated by the network configuration management tool. For example, changes made by the network configuration management tool may be the cause of network behavior detected by the networking monitoring tool. By correlating different types of data, the causes and symptoms of network behavior and configuration changes may be determined and acted upon. The correlations provided assist the network administrator in quickly identifying root cause of network anomalies that are tied to configurations changes made on networking devices.

Figure 1B:
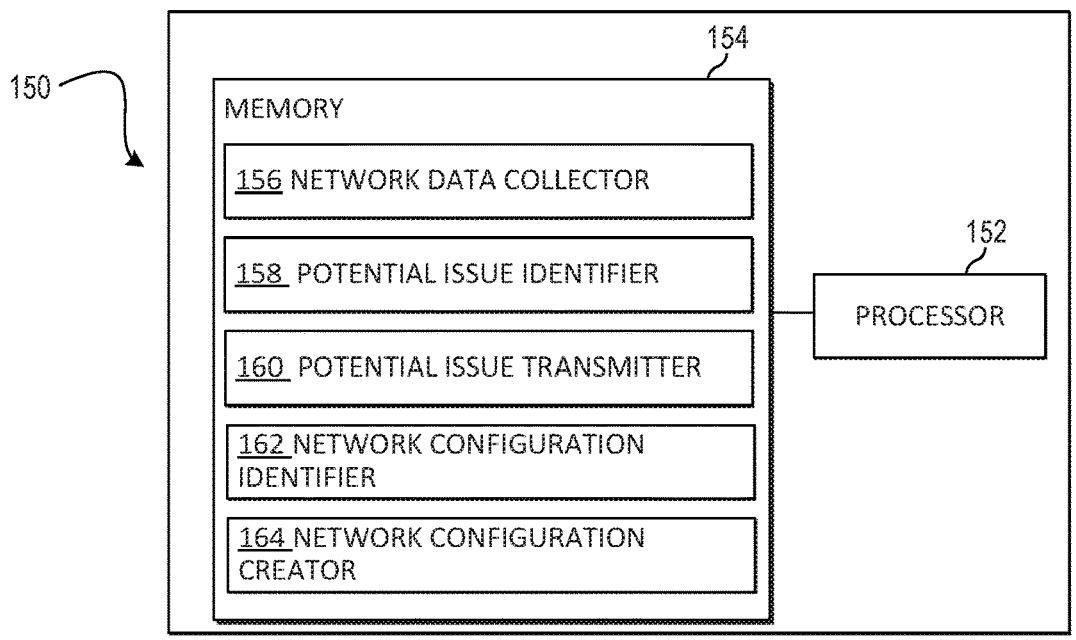
FIG. 1B is a block diagram of an example system for network event correlation.

FIG. 1B is a block diagram of an example system 150 for network event correlation. System 150 may include a processor 152 and a memory 154 that may be coupled to each other through a communication link (e.g., a bus). Processor 152 may include a single or multiple Central Processing Units (CPU) or another suitable hardware processor(s). In some examples, memory 154 stores machine readable instructions executed by processor 152 for system 150. Memory 154 may include any suitable combination of volatile and/or non-volatile memory, such as combinations of Random Access Memory (RAM), Read-Only Memory (ROM), flash memory, and/or other suitable memory.

Memory 154 stores instructions to be executed by processor 152 including instructions for network data collector 156, potential issue identifier 158, potential issue transmitter 160, network configuration identifier 162, network configuration creator 164, and/or other components. According to various implementations, system 150 may be implemented in hardware and/or a combination of hardware and programming that configures hardware. Furthermore, in FIG. 1B and other Figures described herein, different numbers of components or entities than depicted may be used.

Processor 120 may execute network data collector 156 to collect network data from a first device on a network. The collection may be performed by a network monitoring tool, such as network monitoring tool 110a and/or 114a. The network monitoring tool may be executed on the first device on the network. The network data may be time series data corresponding to the first device that is stored in a time series database on the first device.

Processor 120 may execute potential issue identifier 158 to identify a potential issue from the network data, wherein the potential issue corresponds to one aspect of the network. The identification may be performed by a network monitoring tool, such as network monitoring tool 110a and/or 114a. The potential issue may correspond to the first device on the network. Identifying the potential issue may include determining that a value in the network data matches a potential issue criteria and collecting, from a database on the first device, second network data related to the potential issue. In some aspects, data may be collected from numerous devices and/or numerous databases. For example, data may be collected from a second database on a second device on the network, third network data related to the potential issue.

Processor 120 may execute potential issue transmitter 160 to transmit the potential issue to a network management tool. The transmitting may be performed by a network monitoring tool, such as network monitoring tool 110a and/or 114a.

Processor 120 may execute network configuration identifier 162 to identify a first network configuration that the potential issue relates to. The identification may be performed by a network management tool, such as network management tool 104a and/or 106a. The first network configuration may be a network configuration change made to the network using the network management tool within a predetermined period of time. Identifying the first network configuration that the potential issue relates to may include determining, by the network management tool, a number of network configuration changes on the first device that exceed a threshold number and/or determining, by the network management tool, that more than a threshold number of configuration changes of a certain type have been made on devices in the network.

Processor 120 may execute network configuration creator 164 to create a second network configuration for the network to fix the potential issue. The creation may be performed by a network management tool, such as network management tool 104*a* and/or 106*a*. Creating the second network configuration for the network to fix the potential issue may include determining, by the network management tool, that an update for the first device includes a fix for the potential issue.

Figure 2:
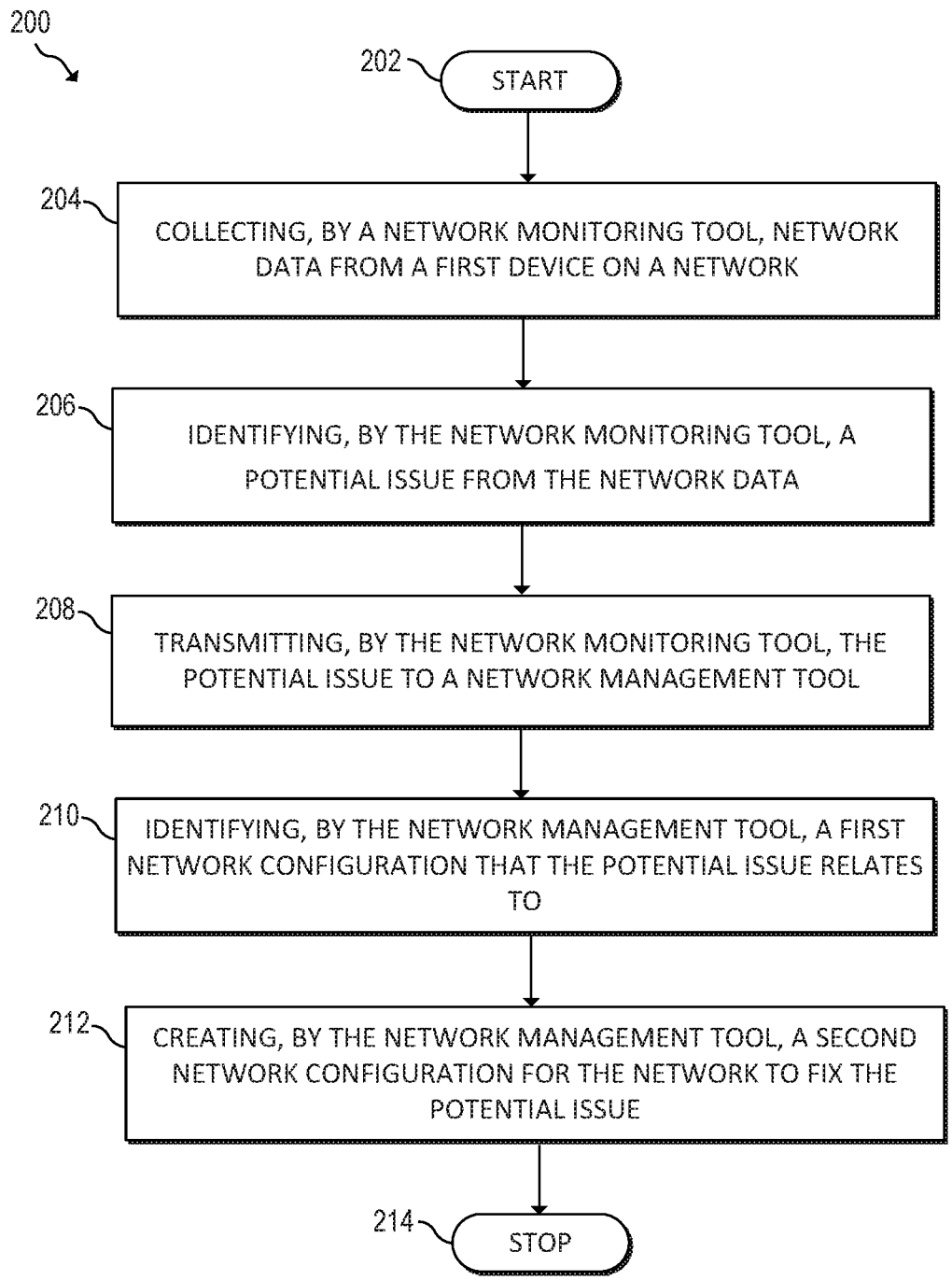
FIG. 2 is a flowchart of an example method for network event correlation.
Figure 3:
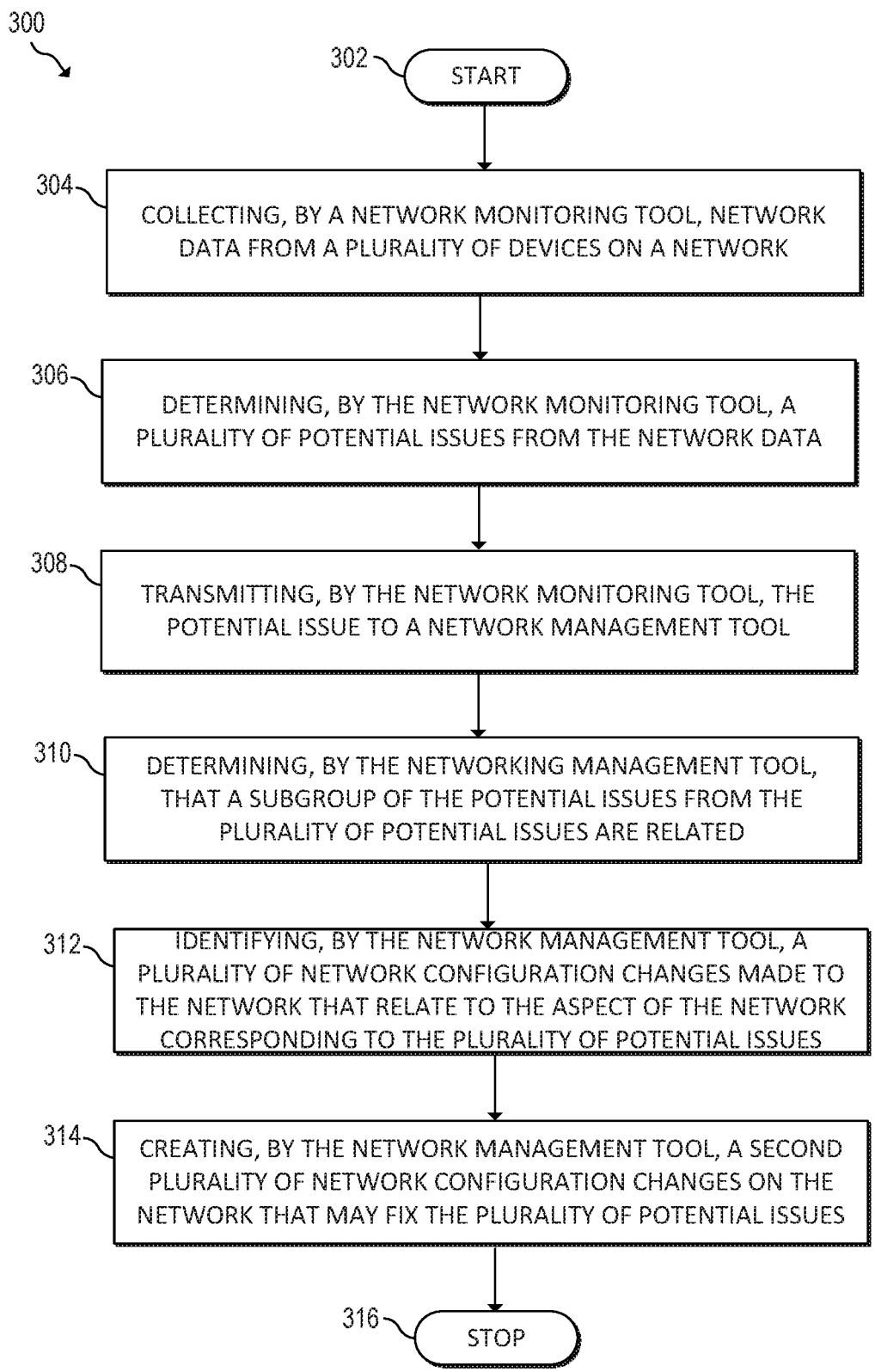
FIG. 3 is a flowchart of another example method for network event correlation.

Referring now to FIGS. 2-3, flow diagrams are illustrated in accordance with various examples of the present disclosure. The flow diagrams represent processes that may be utilized in conjunction with various systems and devices as discussed with reference to the preceding figures, such as, for example, system 100 described in reference to FIG. 1A, system 150 described in reference to FIG. 1B and/or system 400 described in reference to FIG. 4. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 2-3 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 2 is a flow diagram of an example method for network event correlation. The method may begin at block 202 and proceed to block 204 where the method may include collecting, by a network monitoring tool, network data from a first device on a network. At block 206, the method may include identifying, by the network monitoring tool, a potential issue from the network data, wherein the potential issue corresponds to one aspect of the network. At block 208, the method may include transmitting, by the network monitoring tool, the potential issue to a network management tool. At block 210, the method may include identifying, by the network management tool, a first network configuration that the potential issue relates to. At block 212, the method may include creating, by the network management tool, a second network configuration for the network to fix the potential issue. The method may proceed to block 214, where the method may end.

One example consistent with the method 200 may be a passive correlation of data generated/collected by the networking monitoring tool and data generated by a network configuration management tool. A network administrator may make a configuration change to one or more network devices (such as first device 104 and/or second device 106) using one of the network management tools 104*a* and/or 106*a*. One or more of the network monitoring tools 110*a* and/or 114*a* may run on the network devices and create an alert around a specific area. For example, the network administrator and/or other user may set an alert via a rule for Voice over Internet Protocol (VOIP) data. Accordingly, the network monitoring tools 110*a* and/or 114*a* may collect data from network 120, including for example first device 104*a*, second device 106*a*, devices 122, etc. related to VOIP. The collected data may include time series information, state information, configuration information, performance information, etc. The collected data may be stored in one or both of first database 110 and/or second database 114. When a value in this collected data matches a criteria set in the rule, an alert may be generated which provides the alert type, value, and other important information. This information may then be transmitted to one or both of the network monitoring tool 110*a* and/or 114*a*. In some aspects, additional information may also be retrieved from first database 110 and/or second database 114 and transmitted as well. This additional information may include performance and/or configuration of network devices 104, 106, 122 and network 120.

Upon receiving information relating to the alert, the network management tool may analyse the information and retrieve network configuration information for devices on the network related to the alert type. This information may include switch configuration files, LLDP information, network traffic, and others The network configuration information may be retrieved from one or both of the databases 110 and/or 114. The network management tool may also retrieve configuration information from a certain time period relating to the alert. For example, the time threshold could be seconds, minutes, hours, days, etc.

Based on the analysis, network management tool may create and transmit an alert to the network admin highlighting the likely source of the change. The likely source of the change may be, for an example, a recent configuration change that was made, a device that joined the network, an attack on the network, etc. For example, an ACL configuration change was made on access switches which inadvertently blocked an applications traffic. The alert may also recommend a change (eg. config change, port failure, etc.). In some aspects, the network management tool may be configured to automatically implement the recommend change on the network.

A second example consistent with the method 200 may be a proactive correlation of data generated/collected by the networking monitoring tool and data generated by a network configuration management tool. In this example, the network monitoring tool may be used to analyze the latest version of network switch configurations for one or more network switches operating in the network. The network monitoring tool may log certain network settings for each switch. The network settings that are catalogued may be settings of a particular type, settings that are configured higher than a threshold amount, settings that affect certain functionality, settings configured by certain users, types or amount of traffic handled by the switches, etc. Then network monitoring tool may then compare the settings among the different switches on the network to determine which configuration items are the same and/or which are within a threshold amount of similarity. Based on the similarities and differences, the network monitoring tool may recommend settings/scripts/etc, from one switch to another. For example, if first device 104 and second device 106 handle similar types of network traffic, the network monitoring tool may propose applying a configuration setting from second device 106 to the configuration of first device 104.

Yet another example consistent with the method 200 may be a proactive correlation of data generated/collected by the networking monitoring tool and data generated by a network configuration management tool. For example, the network management tool may monitor information logged by the network monitoring tool. If the network management tool detects more than a threshold amount of logging in a particular area, that area may be flagged. The network management tool may analyse updates for the hardware/ software/firmware used in the particular area to determine if there are any fixes for the issue that is being logged.

FIG. 3 is a flow diagram of an example method for network event correlation. The method may begin at block 302 and proceed to block 304 where the method may include collecting, by a network monitoring tool, network data from a plurality of devices on a network. At block 306, the method may include determining, by the network monitoring tool, a plurality of potential issues from the network data, wherein the plurality of potential issues correspond to one aspect of the network. At block 308, the method may include transmitting, by the network monitoring tool, the potential issue to a network management tool. At block 308, the method may include determining, by the networking management tool, that a subgroup of the potential issues from the plurality of potential issues are related. At block 310, the method may include identifying, by the network management tool, a plurality of network configuration changes made to the network using the network management tool that relate to the aspect of the network corresponding to the plurality of potential issues. At block 312, the method may include creating by the network management tool, a second plurality of network configuration changes on the network that may fix the plurality of potential issues. The method may proceed to block 314, where the method may end.

Figure 4:
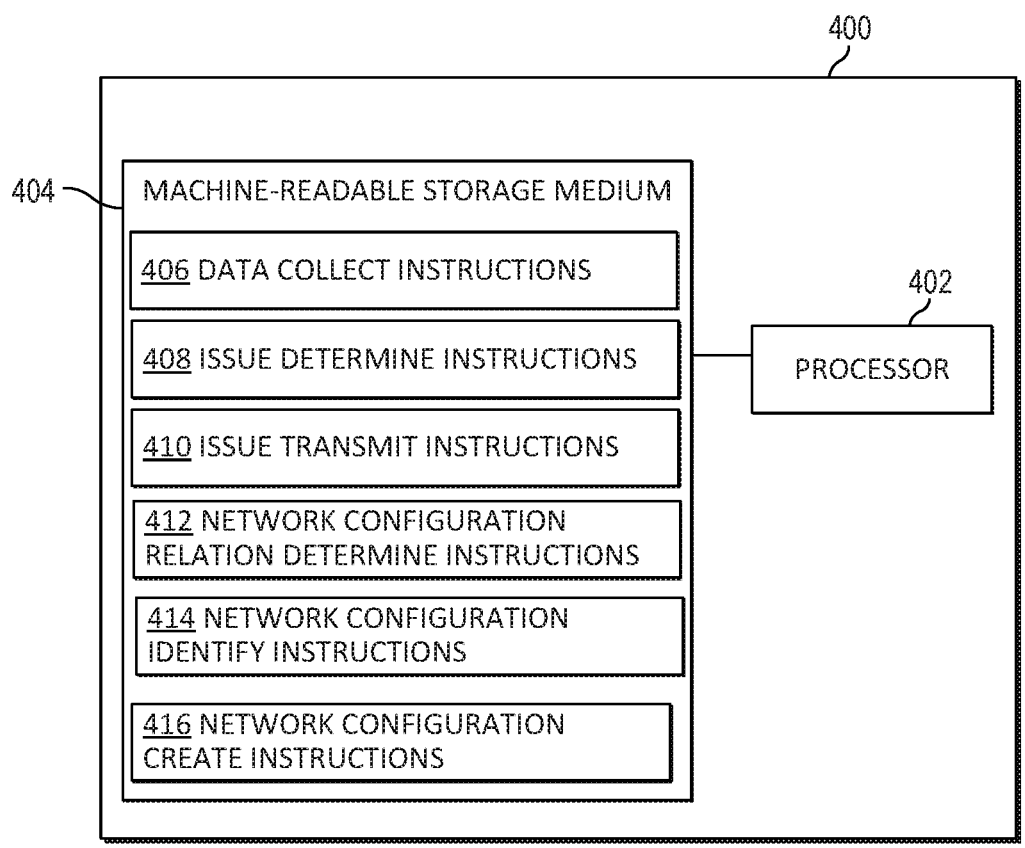
FIG. 4 is a block diagram of another example system for network event correlation.

FIG. 4 is a block diagram of an example storage medium storing machine-readable instructions for network event correlation. In the example illustrated in FIG. 4, system 400 includes a processor 402 and a machine-readable storage medium 404. In some aspects, processor 402 and machine-readable storage medium 404 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), microprocessor, and/or other hardware devices suitable for retrieval and execution of instructions stored in machine-readable storage medium 404. In the example illustrated in FIG. 4, processor 402 may fetch, decode, and execute instructions 406, 408, 410, 412, 414 and 416. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup. The machine-readable storage medium may be non-transitory.

Referring to FIG. 4, data collection instructions 406, when executed by a processor (e.g., 402), may cause system 400 to collect, by a network monitoring tool, network data from a plurality of devices on a network.

Issue determine instructions 408, when executed by a processor (e.g., 402), may cause system 400 to determine, by the network monitoring tool, a plurality of potential issues from the network data, wherein the plurality of potential issues correspond to one aspect of the network. The network data may be time series data corresponding to the first device that is stored in a time series database on the first device. Issue transmit instructions 410, when executed by a processor (e.g., 402), may cause system 400 to transmit, by the network monitoring tool, the potential issue to a network management tool.

Network configuration relation determine instructions 412, when executed by a processor (e.g., 402), may cause system 400 to determine, by the networking management tool, that a subgroup of the potential issues from the plurality of potential issues are related. At least one of the potential issues may correspond to a device on the network. The network monitoring tool may be executed on the first device on the device. Network configuration identify instructions 414, when executed by a processor (e.g., 402), may cause system 400 to identify, by the network management tool, a plurality of network configuration changes made to the network using the network management tool that relate to the aspect of the network corresponding to the plurality of potential issues.

At least one of the network configuration changes may have been made to the network using the network management tool within a predetermined period of time. Identifying that the plurality of network configuration changes made to the network using the network management tool relate to the aspect of the network corresponding to the plurality of potential issues may include determining that a value in the network data matches a potential issue criteria may and collecting, from a database on the device, second network data related to the potential issue. The identification may also include collecting, from a second database on a second device on the network, network data related to the potential issue. The identification may further include determining, by the network management tool, a number of network configuration changes on the first device that exceed a threshold number and/or determining, by the network management tool, that more than a threshold number of configuration changes of a certain type have been made on devices in the network.

Network configuration create instructions 416, when executed by a processor (e.g., 402), may cause system 400 to create, by the network management tool, a second plurality of network configuration changes on the network that may fix the plurality of potential issues. Creating the second plurality of network configuration changes may include determining, by the network management tool, that an update for the device includes a fix for the potential issue.

The foregoing disclosure describes a number of examples for network event correlation. The disclosed examples may include systems, devices, computer-readable storage media, and methods for network event correlation. For purposes of explanation, certain examples are described with reference to the components illustrated in FIGS. 1A-4. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1A-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method, comprising:
   obtaining network data by monitoring a first device on a network, wherein the network data comprises event logs associated with different areas in the network;
   correlating the network data with configuration data for configuring the network, which comprises:
      in response to determining that an amount of logged events in an area exceeds a predetermined threshold, flagging the area; and
      analyzing configuration data associated with the flagged area to determine a first network configuration related to at least one logged event, wherein
   determining the first network configuration related to the at least one logged event comprises determining whether a number of configuration changes of a particular type exceeds a predetermined threshold number within a predetermined time interval; and
   creating a second network configuration for the network to fix a potential issue associated with the at least one logged event.

2. The method of claim 1, wherein the first network configuration is a network configuration change made to the network within the predetermined time interval.

3. The method of claim 1, wherein the potential issue corresponds to the first device on the network.

4. The method of claim 1, wherein a process to monitor the first device is executed on the first device on the network.

5. The method of claim 1, wherein the network data is time series data corresponding to the first device that is stored in a time series database on the first device.

6. The method of claim 1, comprising:
   determining that a value in the network data matches a potential issue criterion; and
   collecting, from a database on the first device, second network data related to the potential issue.

7. The method of claim 6, comprising:
   collecting, from a second database on a second device on the network, third network data related to the potential issue.

8. The method of claim 1, comprising:
   determining whether a number of network configuration changes on the first device exceeds a second predetermined threshold number.

9. The method of claim 1, comprising:
   determining that an update for the first device includes a fix for the potential issue.

10. A non-transitory machine-readable storage medium encoded with instructions, the instructions executable by a processor of a system to cause the system to:
    collect network data from a plurality of devices on a network, wherein the collected network data comprises event logs associated with different areas in the network;
    correlate the network data with configuration data for configuring the network, which comprises:
       in response to determining that an amount of logged events in an area exceeds a predetermined threshold, flagging the area; and
       analyzing configuration data associated with the flagged area to determine a first network configuration related to at least one logged event,
    wherein determining the first network configuration related to the at least one logged event comprises determining whether a number of configuration changes of a particular type exceeds a predetermined threshold number within a predetermined time interval; and
    create a second network configuration for the network to fix a potential issue associated with the at least one logged event.

11. The non-transitory computer-readable storage medium of claim 10, the instructions executable by a processor of a system to cause the system to:
    determine that a value in the network data matches a criterion associated with the potential issue; and
    collecting, from a database on a first device, second network data related to the potential issue.

12. The non-transitory computer-readable storage medium of claim 10, the instructions executable by a processor of a system to cause the system to:
    collect, from a second database on a second device on the network, third network data related to the potential issue.

13. The non-transitory computer-readable storage medium of claim 10, the instructions executable by a processor of a system to cause the system to:
    determine whether a number of network configuration changes on the plurality of devices on the network exceeds a second threshold number.

14. A computer system, comprising:
    a processor;
    a storage device coupled to the processor and storing instructions, which when executed by the processor cause the processor to perform a method, the method comprising:
       collecting network data from a first device on a network, including an amount of logged events in an area;
       correlating the network data collected by a network monitoring tool with
       configuration data generated by a network management tool, which comprises:
          in response to determining that the amount of logged events in the area exceeds a predetermined threshold, flagging the area; and
          analyzing configuration data associated with the flagged area to identify a first network configuration related to at least one logged event,
       wherein determining the first network configuration related to the at least one logged event comprises determining whether a number of configuration changes of a particular type exceeds a predetermined threshold number within a predetermined time interval; and creating a second network configuration for the network to fix a potential issue associated with the at least one logged event.

15. The computer system of claim 14, wherein the first network configuration is a network configuration change made to the network within the predetermined time interval.

16. The computer system of claim 14, wherein the potential issue corresponds to the first device on the network.

17. The computer system of claim 14, wherein a process to monitor the first device is executed on the first device on the network.

18. The computer system of claim 14, wherein the network data is time series data corresponding to the first device that is stored in a time series database on the first device.

* * * * *